(12) United States Patent
Groult et al.

(10) Patent No.: US 10,710,580 B2
(45) Date of Patent: Jul. 14, 2020

(54) TAILGATING SITUATION HANDLING BY AN AUTOMATED DRIVING VEHICLE

(71) Applicant: Valeo Schalter und Sensoren GmbH, Bietigheim-Bissingen (DE)

(72) Inventors: Xavier Marie Groult, Bietigheim-Bissingen (DE); Alexandre Jacques Garnault, San Mateo, CA (US); Thomas Heitzmann, Bietigheim-Bissingen (DE); Charles-Henri Francois Quivy, Bietigheim-Bissingen (DE)

(73) Assignee: VALEO SCHALTER UND SENSOREN GMBH (DE)

( * ) Notice: Subject to any disclaimer, the term of this patent is extended or adjusted under 35 U.S.C. 154(b) by 122 days.

(21) Appl. No.: 15/950,012

(22) Filed: Apr. 10, 2018

(65) Prior Publication Data
US 2019/0308617 A1    Oct. 10, 2019

(51) Int. Cl.
| | | |
|---|---|---|
| *B60W 30/09* | (2012.01) | |
| *B60W 30/095* | (2012.01) | |
| *B60W 40/04* | (2006.01) | |
| *B60W 50/00* | (2006.01) | |
| *B60W 30/18* | (2012.01) | |

(52) U.S. Cl.
CPC ........ *B60W 30/09* (2013.01); *B60W 30/0956* (2013.01); *B60W 30/18163* (2013.01); *B60W 40/04* (2013.01); *B60W 50/0098* (2013.01); *B60W 2400/00* (2013.01); *B60W 2420/42* (2013.01); *B60W 2420/52* (2013.01); *B60W 2554/801* (2020.02); *B60W 2556/00* (2020.02); *B60W 2720/10* (2013.01); *B60W 2754/30* (2020.02)

(58) Field of Classification Search
USPC ........................................................... 701/23
See application file for complete search history.

(56) References Cited

U.S. PATENT DOCUMENTS

| | | | |
|---|---|---|---|
| 2004/0236596 A1* | 11/2004 | Chowdhary | G06Q 30/0601 705/26.1 |
| 2013/0057397 A1* | 3/2013 | Cutler | B62D 15/0255 340/435 |

(Continued)

*Primary Examiner* — Tyler D Paige
(74) *Attorney, Agent, or Firm* — Kilpatrick Townsend & Stockton LLP

(57) ABSTRACT

An apparatus and corresponding methods for detecting a tailgating situation involving a second motor vehicle behind an automated vehicle, and performing an automated safety routine in response to the detected tailgating situation. The tailgating situation is detected based on a simultaneous occurrence of two or more conditions involving an estimated time to collision, lateral offsets of both vehicles with respect to a center of a lane, activation of a turn signal blinker of the second motor vehicle, or flashing of a headlamp of the second motor vehicle. The safety routine includes performing a lane change to an adjacent lane. When no adjacent lanes are available for a lane change, a maximum permissible deceleration rate is decreased while increasing a time gap between the automated vehicle and a third motor vehicle directly in front of the automated vehicle by automatically adjusting an amount of at least one of acceleration or braking.

20 Claims, 10 Drawing Sheets

(56) References Cited

U.S. PATENT DOCUMENTS

| | | | |
|---|---|---|---|
| 2015/0193885 A1* | 7/2015 | Akiva | G06Q 40/08 |
| | | | 705/4 |
| 2017/0329330 A1* | 11/2017 | Hatano | B62D 15/025 |
| 2017/0369055 A1* | 12/2017 | Saigusa | G08G 1/096791 |
| 2018/0173236 A1* | 6/2018 | Yashiro | G05D 1/0214 |
| 2018/0326956 A1* | 11/2018 | Zhu | B60T 7/22 |
| 2019/0129416 A1* | 5/2019 | Upmanue | G05D 1/0061 |

* cited by examiner

Partial Lookup Table 90

Distance to the rear vehicle (feet)

| | | Speed Difference (mph) | | | |
|---|---|---|---|---|---|
| | | 0-10 | 11-15 | 15-20 | 20+ |
| | | | | | |
| 0-6 | | 7.5 | 6.9 | 6 | 6 |
| 6.1-12 | | 9 | 8.4 | 7.5 | 6.9 |
| 12.1-24 | | 9 | 8.7 | 8.1 | 7.5 |
| 24.1-30 | | 10.5 | 9.9 | 8.7 | 8.1 |
| 30.1-35 | | 12 | 11.4 | 10.5 | 9.6 |

Maximum Permissible Deceleration Rate (ft/s$^2$)

FIG. 9

TAILGATING SITUATION HANDLING BY AN AUTOMATED DRIVING VEHICLE

BACKGROUND

Motor vehicles are being equipped with increasing amounts of sensor technology designed to assist drivers in manually handling their vehicles in a variety of situations. These sensors enable a variety of features such as parking assist, lane departure warning, and blind spot detection, all of which are now available as add-ons to standard vehicle configurations. Some of these sensors are also being used in connection with automated driving. Autonomous driving technology has experienced rapid development in recent years, but is still a long way from being able to operate without human control in all situations.

One commonly encountered situation that poses a difficult challenge to automated control is aggressive driving behavior by other drivers, in particular, tailgating. Because automated driving control techniques are designed to prioritize safety, a vehicle operating under automated control may travel more slowly than a manually operated vehicle. Thus the frequency with which an automated vehicle encounters a tailgater may be higher compared to manual driving. Automated vehicles therefore need to be able to handle tailgating situations in an effective manner. In addition, fully autonomous vehicles should be able to safely handle all situations, regardless of probability of occurrence of each situation.

SUMMARY OF INVENTION

The present disclosure relates to techniques for detecting and responding to tailgating situations while a vehicle is operating in an automated driving mode. One aspect of the present disclosure relates to how tailgating situations can be accurately detected using sensor data collected by the vehicle. The sensor data can be used to detect a tailgating situation as well as to perform various response measures. Thus, another aspect of the present disclosure relates to how a vehicle operating in an automated driving mode can respond appropriately to a detected tailgating situation. Various response measures are described and can be incorporated into an automated safety routine. Potential response measures include, among other things, changing lanes, increasing a time gap to a forward vehicle, and decreasing a maximum permissible deceleration rate.

Unlike manual driving, automated vehicles can take advantage of additional types of data that are not available to a human driver. This additional data can be applied to detect and respond to tailgating situations in ways that a driver would not. For example, increasing a time gap to a forward vehicle is not a response that would be expected from a driver. Similarly, a driver does not usually make driving decisions in consideration of a maximum permissible deceleration rate. Further, the processing steps by which a vehicle achieves a result in an automated manner may be different than any mental processing performed by a driver for achieving a similar result. For example, manual driving decisions are subjectively determined based on mental approximations of how a driver's vehicle is situated in relation to other vehicles within a field of the view of the driver, who generally cannot focus attention on multiple directions simultaneously. In contrast, automated driving maneuvers in accordance with embodiments of the present disclosure are precisely determined based on calculations that can use sensor data from multiple directions around the vehicle to, for example, place the vehicle in a predetermined position with respect to a forward vehicle and a rear vehicle, and possibly with respect to a vehicle in an adjacent lane.

Example embodiments are directed to a method performed by a processor of a computer in a first motor vehicle. The method includes detecting, by the processor while the first motor vehicle is in an automated driving mode, a tailgating situation involving a second motor vehicle behind the first motor vehicle. The detection of the tailgating situation can be based on a simultaneous occurrence of a plurality of conditions that are described later below. The method further includes performing an automated safety routine in response to the detected tailgating situation, the safety routine including, as an initial course of action, performing a lane change to an adjacent lane when the adjacent lane is available. Thus, the automated safety routine may default to a lane change if there is an adjacent lane available for the lane change.

When no adjacent lanes are available for a lane change, the processor may decrease a maximum permissible deceleration rate while increasing a time gap between the first motor vehicle and a third motor vehicle directly in front of the first motor vehicle. The time gap can be increased by automatically adjusting an amount of at least one of acceleration or braking. By increasing the time gap, a risk of the first motor vehicle colliding with the second motor vehicle is reduced, in part because the first motor vehicle has more time to react to changes in a driving situation, e.g., sudden braking by the third motor vehicle, without surprising the driver of the second motor vehicle.

Example embodiments are directed to an automated driving apparatus including a control circuit in a first motor vehicle. The control circuit is operable to receive data from a plurality of sensors positioned along a perimeter of the first motor vehicle. The sensors may include radar sensors, Light Detection and Ranging (LIDAR) sensors, and cameras. The control circuit is further operable to detect, while the first motor vehicle is in an automated driving mode, a tailgating situation involving a second motor vehicle behind the first motor vehicle. The control circuit may, in response to the detected tailgating situation, perform an automated safety routine including, as an initial course of action, initiating a lane change to an adjacent lane when the adjacent lane is available. When no adjacent lanes are available for a lane change, the control circuit may decrease a maximum permissible deceleration rate while increasing a time gap between the first motor vehicle and a third motor vehicle directly in front of the first motor vehicle by automatically adjusting an amount of at least one of acceleration or braking.

BRIEF DESCRIPTION OF THE DRAWINGS

Various embodiments in accordance with the present disclosure will be described with reference to the drawings, in which:

FIG. 9 is a simplified example of a lookup table for setting a maximum permissible deceleration rate, according to certain aspects of the present disclosure;

DETAILED DESCRIPTION OF THE INVENTION

Figure 1:
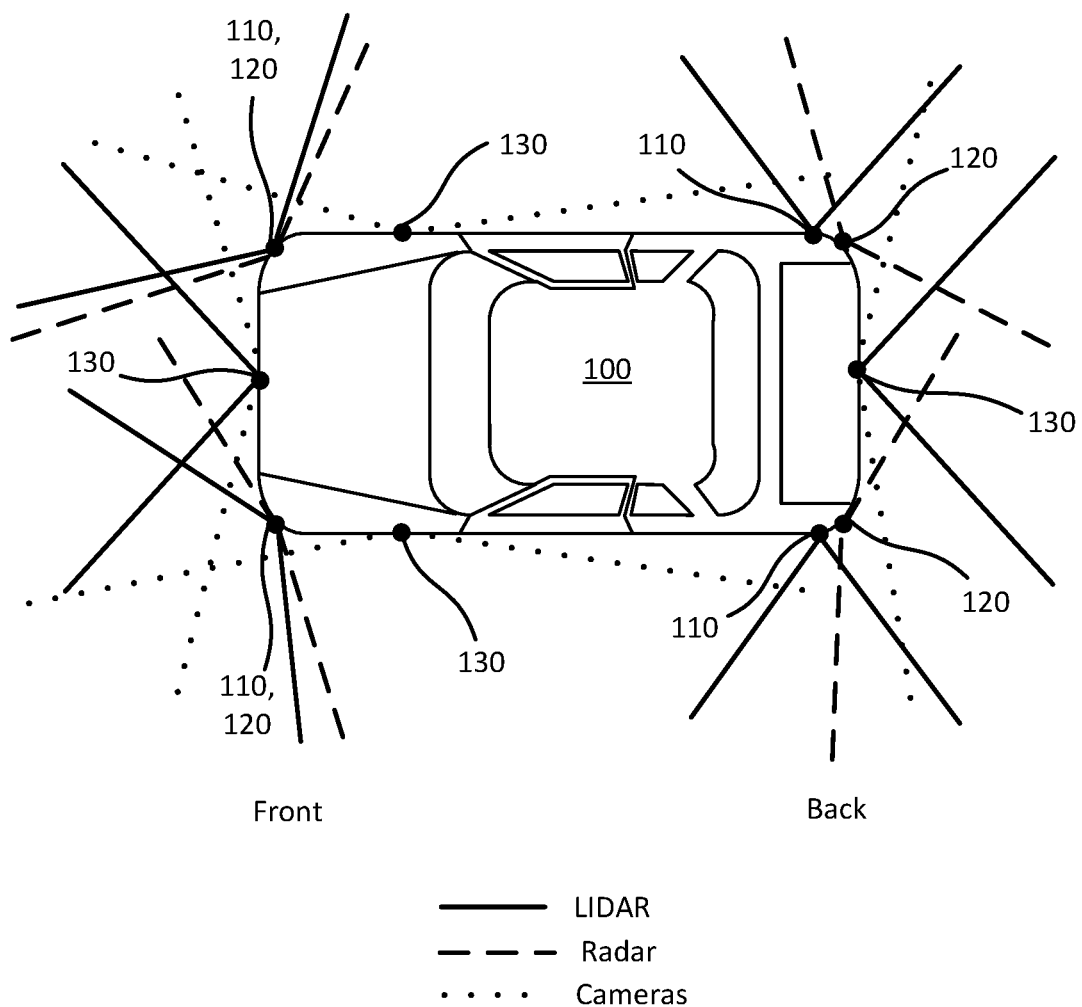
FIG. 1 illustrates coverage areas of a variety of vehicle sensors, for automated operation in connection with certain aspects of the present disclosure.

The present disclosure relates to techniques for detecting and responding to tailgating situations while operating in an automated driving mode. The techniques can be implemented in any vehicle equipped with a sensor suite capable of detecting various conditions described herein. The present disclosure makes reference to certain types of sensors, including radar sensors, Light Detection and Ranging (LIDAR) sensors, global positioning system (GPS) sensors, ultrasonic sensors, and cameras. However, it will be understood that as newer sensor technologies develop, such new sensors could be applied to the techniques described herein. The techniques are implemented on a vehicle with automated driving capabilities and described from the perspective of such a vehicle; this vehicle is referred to herein as an "ego vehicle." A vehicle with automated driving capabilities may include an advanced driver assistance system (ADAS), such as an automated cruise control (ACC) system, a lane change assistance system, a blind spot detection system, a parking assistance system or any other type of automated system. In some implementations, the automated vehicle may handle tailgating based on vehicle-to-vehicle communications with other vehicles to supplement sensor data.

The embodiments described in the present disclosure may be used in vehicles that offer various degrees of automated driving capabilities, ranging from partial driver assistance to full automation of all aspects of the driving task. The National Highway Traffic Safety Administration (NHTSA) and Society of Automotive Engineers (SAE) International define levels of vehicle autonomy as follows:

Level 0, where the driver is in full control of the vehicle;

Level 1, where a driver assistance system controls steering or acceleration/deceleration;

Level 2, where the driver assistance system controls steering and acceleration/deceleration, and where the driver performs all other aspects of the driving task;

Level 3, where all aspects of driving are performed by the driver assistance system, but where the driver may have to intervene if special circumstances occur that the automated vehicle is unable to safely handle;

Level 4, where all aspects of driving are performed by the driver assistance system, even in situations where the driver does not appropriately respond when requested to intervene; and Level 5, where the vehicle drives fully autonomously in all driving situations, with or without a passenger.

It should be noted that the term "autonomous vehicle" is sometimes used in the art to refer to any level of automation. However, in this document, "automated vehicle" is used to refer to level 1 through level 3 of automation, for when the driver assistance system controls at least some aspects of driving, but some input from a human driver can still be expected, and the term "autonomous vehicle" is used to refer to levels 4 and 5 of automation, for when there is little or no intervention by a human driver. To distinguish from manual driving, the term "automated driving mode" is used herein to refer to a vehicle operating under any of levels 1 through 5. Thus, a vehicle operating in an automated driving mode can be an automated vehicle or an autonomous vehicle.

One aspect of the present disclosure relates to the detection of a tailgating situation based on the simultaneous occurrence of multiple conditions associated with aggressive, tailgating indicative driving behavior. The inventors have identified a specific set of conditions for which simultaneous occurrence of at least three of these conditions is a reliable indicator of tailgating. It will of course be understood that the specific number of conditions required for a situation to be deemed tailgating can be more or less depending on various factors such as, for example, a desired detection sensitivity or an accuracy with which the sensors of a subject vehicle can detect certain conditions. In some embodiments, two of these conditions may be used to detect tailgating, however, the probability of false positives may be higher than when three or more conditions are considered. In some implementations, a more complex detection scheme may be employed, for example, in which certain conditions must be detected in order to qualify as a tailgating situation, irrespective of the total number of conditions detected. Other variations on a tailgating detection scheme are also possible.

Another aspect of the present disclosure relates to how to handle a tailgating situation once it has been detected. Various response measures are described and can be incorporated into a safety routine performed by an automated driving controller. Not all of the response measures described need to be employed in the safety routine. In some implementations, additional response measures may be included or certain response measures omitted. In a preferred embodiment, a lane change is attempted as an initial course of action when there is tailgating. Although other measures can be taken before changing lanes, a lane change is one of the safest ways to deal with a tailgater because it allows the tailgater to pass, thereby eliminating further interaction with the tailgater.

FIG. 1 shows an automated vehicle 100 equipped with a plurality of sensors, including LIDAR sensors 110, radar sensors 120, and cameras 130. In addition to these sensors, other types of sensors suitable for use with the techniques described include GPS sensors, infrared sensors, microphones, ultrasonic sensors, and any other type of sensor. Each of the sensors 110, 120, and 130 has a corresponding coverage area, shown in FIG. 1 as an angular field of view. The coverage areas are not drawn to scale and may, for example, extend at different angles or ranges than those depicted. Instead, FIG. 1 is to illustrate that with appropriate placement of the sensors, a variety of data can be gathered in all directions along a perimeter of the vehicle 100 for 360 degrees of coverage. Additionally, FIG. 1 illustrates the principle of redundant coverage, as seen from the overlapping coverage areas. This is important because certain types of sensors are better suited than others for detecting certain conditions. For example, a LIDAR sensor may be used to detect distance to another object better than a camera, but light originating from the object might be better tracked using image processing of still or video images captured by the camera. As another example, radar has a longer range and can easily operate at night or in cloudy conditions, but LIDAR can detect smaller objects and at a higher resolution compared to radar. Redundancy also permits continuous coverage when a sensor malfunctions. A vehicle implementing one of the methods described herein can be equipped with radar sensors that provide at a least partial overlap in coverage with LIDAR sensors in an environment around the vehicle.

Figure 2:
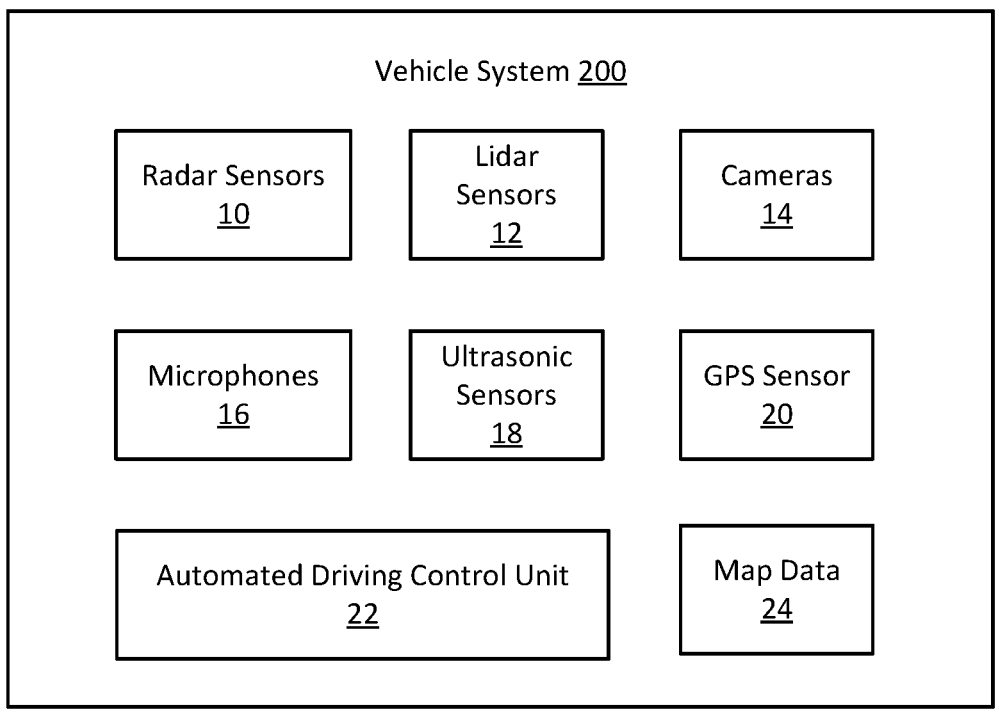
FIG. 2 is a block diagram of various vehicle components, according to certain aspects of the present disclosure.

FIG. 2 is a block diagram of a vehicle system 200. The system includes a sensor suite comprising radar sensors 10, LIDAR sensors 12, cameras 14, microphones 16, ultrasonic sensors 18, a GPS sensor 20, an automated driving control unit 22, and map data 24. The radar sensors 10, the LIDAR sensors 12, and the cameras 14 can be mounted in various locations throughout the vehicle. For example, the sensors may be positioned as shown in FIG. 1, with a radar sensor and a LIDAR sensor at each of the four corners of the vehicle, a front facing camera, a rear facing camera, and a pair of cameras near the driver and front passenger doors. The microphones 16 and the ultrasonic sensors 18 operate to detect sounds from the external environment including, for example, detecting an activation of another vehicle's horn and a direction from which the horn sound originates. In some implementations, at least one of the microphones 16 operate to detect internal sounds for diagnosis of problems such as engine knocking. The ultrasonic sensors 18 may be used during parking maneuvers of a vehicle to identify distances from objects in a vicinity of the vehicle based on a timing of ultrasonic waves reflected from the objects and notify the driver of objects that are very close to the vehicle (e.g., closer than a certain threshold distance).

The GPS sensor 20 tracks a position of the vehicle through communications with satellites. The GPS sensor 20 may operate in conjunction with an electronic map to provide real time tracking of the vehicle's position with respect to a geographical area of the electronic map. The electronic map may be stored locally for use with an onboard vehicle navigation system, e.g., stored as part of the map data 24. In some implementations, the map data 24 is updated using information transmitted to the vehicle by an external communications system such as a traffic monitoring station. Map updates can be triggered manually or automatically, for example at specified time intervals or when the vehicle enters a geographical area not described by the map data 24.

The automated driving control unit 22 controls vehicle operations while the vehicle is operating in an automated driving mode, for example, operating as an automated vehicle, and may include one or more processors. The processors can be implemented with one or more general purpose computer processors that execute software instructions stored on a non-transitory computer readable storage medium such as flash memory, a hard disk, a solid state drive, etc. Such processors may, in addition to performing automated control, also operate to control other aspects of the vehicle such as climate control, entertainment, or navigation. Alternatively, the processors can be implemented with a field-programmable array, application-specific integrated circuits, or other processing hardware dedicated to automated control.

Figure 3:
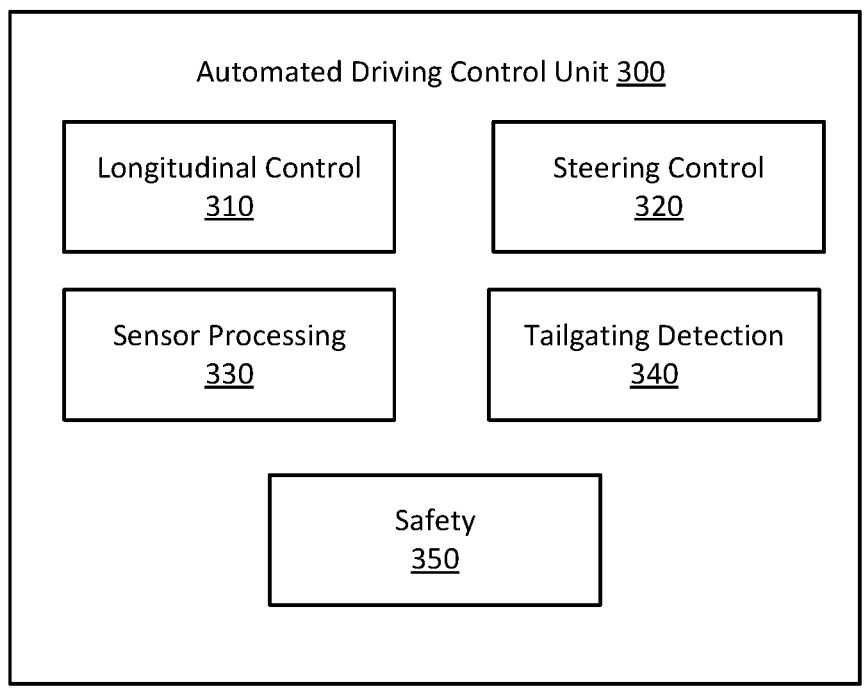
FIG. 3 is a block diagram of an automated driving control unit, according to certain aspects of the present disclosure.

FIG. 3 shows an automated driving control unit 300, which can be implemented in hardware, software, or a combination of both. For example, the control unit 300 may comprise software code executed by a processor that performs other vehicle functions such as navigation. Alternatively, the control unit 300 may comprise dedicated circuitry or hardware. The control unit 300 includes a longitudinal control module 310, a steering control module 320, a sensor processing module 330, a tailgating detection module 340, and a safety module 350. The longitudinal control module 310 sets longitudinal control parameters for the automated vehicle. The longitudinal control parameters can include an acceleration amount, a braking amount, a target speed, and other parameters that govern longitudinal motion.

The steering control module 320 sets lateral control parameters for the automated vehicle and may implement routines for steering maneuvers, such as fine steering adjustments for lane keeping and coarse steering adjustments for lane changes and turns.

The sensor processing module 330 collects and processes data from the sensor suite. The module 330 may analyze the collected data through one or more fusion processes. Fusion refers to a process by which data from multiple sensors of the same type or different types are combined to determine something which could not otherwise be determined by one sensor alone, thereby correcting for the deficiencies of any individual sensor. For example, in FIG. 1 data captured by the radar sensors 120 positioned at the front corners of vehicle 100 could be fused to form a more complete description of the surroundings in front of the vehicle. The data of the front facing radar sensors 120 could also be fused with data of the front facing LIDAR sensors 110 to form an even more complete description of the surroundings in front of the vehicle. A variety of fusion techniques exist which would be suitable for use with the embodiments described herein. One of ordinary skill would readily be able to select from these fusion techniques given the objectives described.

The sensor processing module 330 may include image and audio processing routines for processing data captured by the cameras 14, the microphone 16, and the ultrasonic sensor 18. For example, the module 330 may receive a real time stream of images from the cameras 14 and process the images to recognize and track vehicles and other objects of interest within the fields of view of the cameras 14. The module 330 may also analyze audio signals from the microphones 16 to, among other things, determine whether a horn is activated and a frequency or intensity of the horn. The processing of the audio signals may distinguish between horns from a vehicle directly behind the automated vehicle and horns from other neighboring vehicles, such as a vehicle in front of the automated vehicle, a vehicle in an adjacent lane, and vehicles not directly behind the automated vehicle. Similarly, by processing signals received by the ultrasonic sensors 18, the sensor processing module 330 can detect objects surrounding the vehicle.

Figure 5:
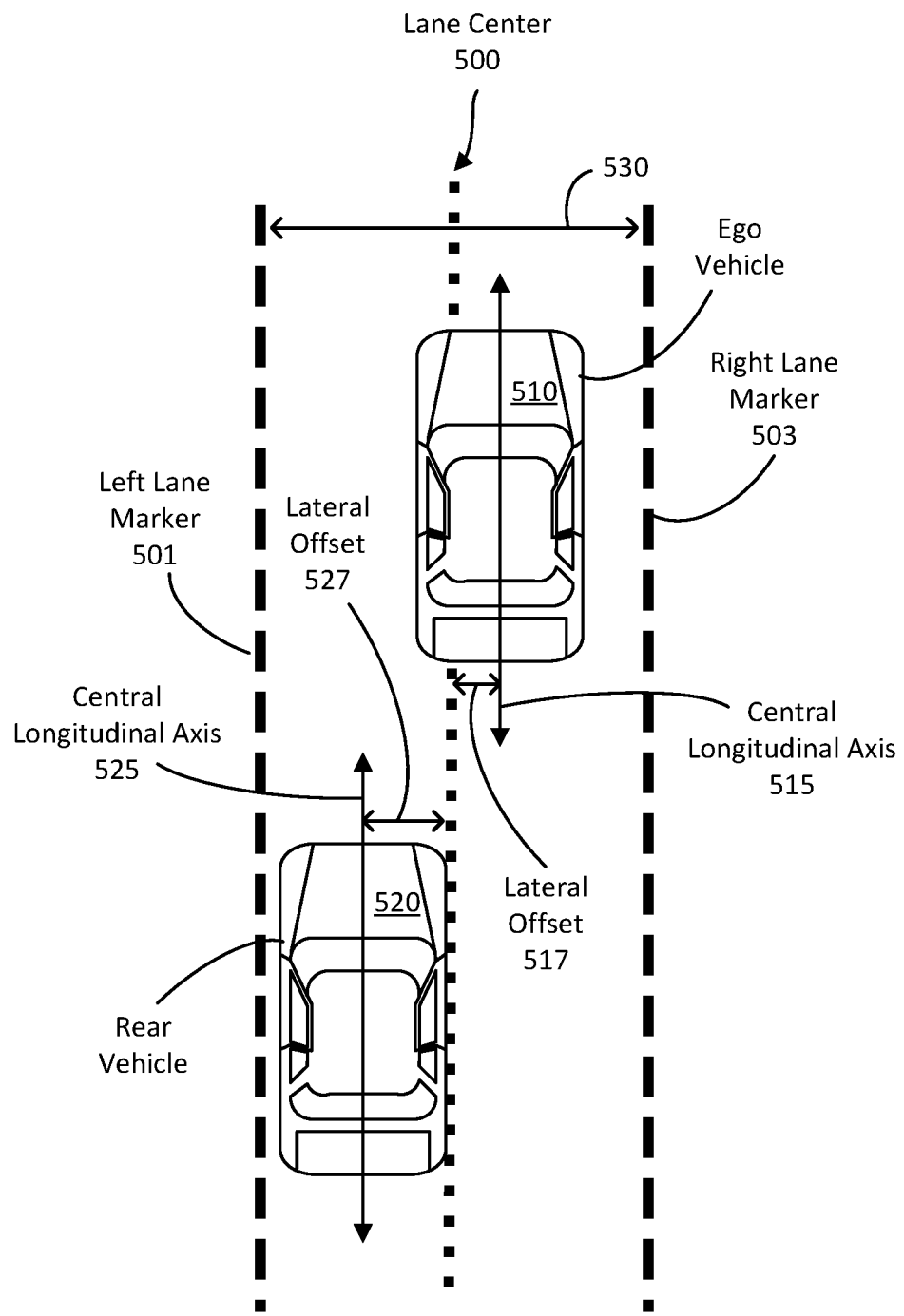
FIG. 5 illustrates detection of lateral offsets with respect to a center of a lane.

The tailgating detection module 340 detects tailgating situations using information supplied by the sensor processing module 330. In particular, the module 340 monitors the vehicle surroundings to detect the occurrence of several conditions described below. The module 340 is configured to output a signal indicating that a tailgating situation has been detected and can be implemented, for example, in hardware as a finite state machine or, more generally, using digital logic. For example, the module 340 may include voting logic, as shown in FIG. 5. Alternatively, the module 340 can be implemented as one or more software routines, for example a plurality of concurrently executed software algorithms, each of which monitors for a specific condition.

The safety module 350 operates to perform a variety of safety measures in response to dangerous driving situations, including tailgating situations detected by the tailgating detection module 340. Examples of safety measures are described below and include changing lanes, adjusting longitudinal control parameters in consideration of the automated vehicle's surroundings, and flashing warning lights. The external surroundings taken into consideration by the module 350 include, for example, neighboring vehicles, road conditions, and weather conditions. The safety module 350 may also perform the safety measures taking in consideration the operating characteristics of the automated vehicle, for example the acceleration or deceleration performance of the automated vehicle, tire pressure or wear, vehicle size and weight in relation to neighboring vehicles, etc. Additionally, the safety module 350 may take into consideration the physical characteristics or emotional states of occupants in the automated vehicle. For example, if a cabin facing camera detects that the driver is drowsy or inattentive, the safety module 350 may allow for additional time to execute a safety measure that involves maneuvering the automated vehicle. In one implementation, the safety module 350 varies an amount of longitudinal control based on the ages of the occupants, for example, by lowering a maximum permissible deceleration rate for infants and adolescents compared to adults below a certain age. The safety module 350 may obtain age information based on manual input from an occupant or estimate an approximate age or age range of each occupant, for example using image processing.

One indicator of a tailgating situation is the time to collision between an ego vehicle and a rear vehicle. The time to collision can be estimated based on factors such as the speeds of the vehicles and the distance between the vehicles. In 2002, the International Organization for Standardization (ISO) Technical Committee 204, Working Group 14 established standards for a Forward Vehicle Collision Warning System (FVCWS), requiring the system to address collisions between a subject vehicle and vehicles or other obstacles in front of the subject vehicle. An FVCWS uses sensors to obtain speed and distance between the subject vehicle and a forward vehicle in the same lane, checks this data against warning criteria, and provides the driver of the subject vehicle with a warning when the relative distance between the forward vehicle and the subject vehicle is below a pre-set warning distance that takes into account the speeds of both vehicles, the accelerations or decelerations of both vehicles, and the brake reaction time of the driver of the subject vehicle, according to the following formula:

$$D <= V*T + (V^2/2a - V_f^2/2a_f)$$

where D is the following distance of the subject vehicle, V is the velocity of the subject vehicle, $V_f$ is the velocity of the forward vehicle, T is the brake reaction time, a is the acceleration or deceleration of the subject vehicle, and $a_f$ is the acceleration or deceleration of the forward vehicle.

The formula above can be adapted to determine a time to collision between an ego vehicle and a rear vehicle, for example by considering the acceleration/deceleration reaction time of the ego vehicle rather the brake reaction time of the driver of the rear vehicle. Other ways to estimate the time to collision with the rear vehicle are also possible. If the estimated time to collision is below a certain value, for example 0.5 seconds, then the tailgating detection module 340 may flag this first condition as "true." Thus, the first condition may be that an estimated time to collision between the ego vehicle and the rear vehicle is below a threshold time to collision. Other conditions that can be monitored by the tailgating detection module 340 are described below. When a certain number or certain ones of these conditions have been flagged as true, the tailgating detection module 340 can output an indication of a tailgating situation, for example an audio alert to the driver of the automated vehicle. The tailgating detection module 340 may also communicate the detection of the tailgating situation to the safety module 350 to trigger an appropriate safety measure in response to the tailgating situation.

Figure 4:
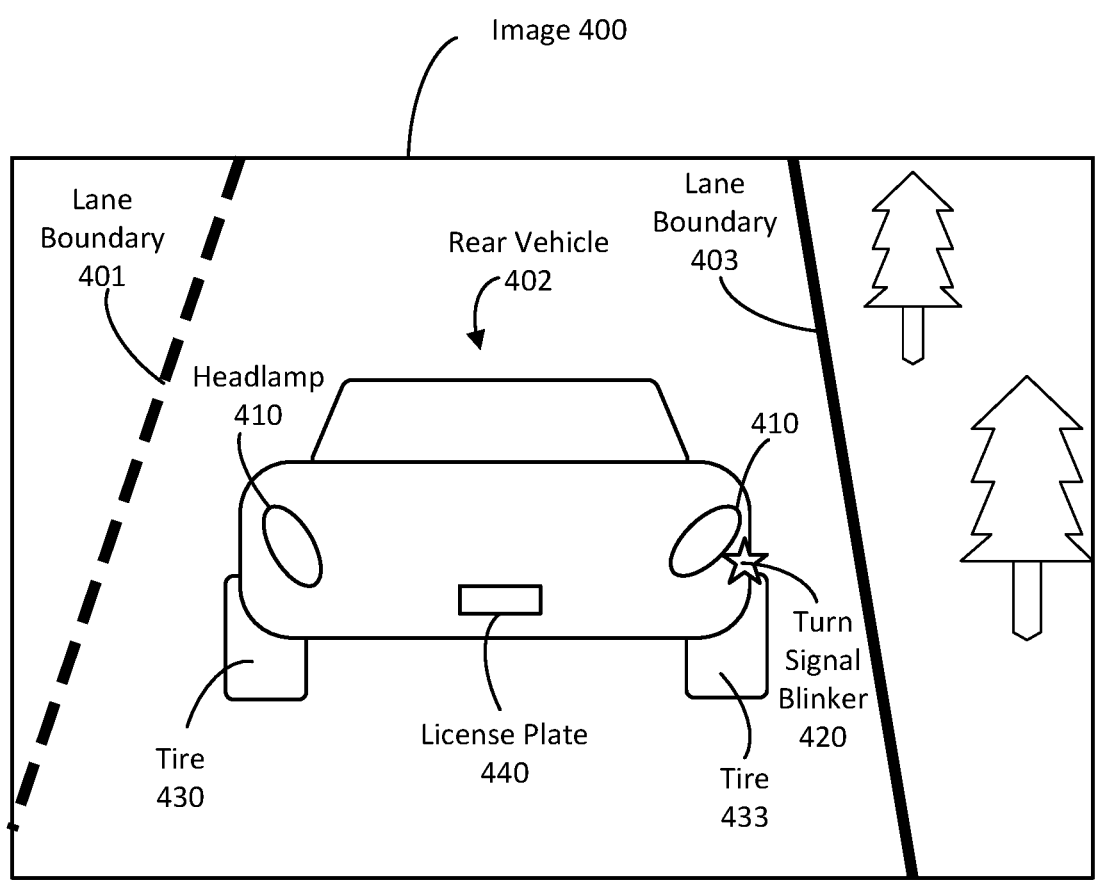
FIG. 4 is a simplified representation of an image captured by a rear facing camera in an automated vehicle.

FIG. 4 is a simplified representation of an image 400 captured by a rear facing camera of an ego vehicle, e.g., a camera mounted on a rear of the ego vehicle. The image 400 includes a rear vehicle 402. The rear vehicle 402 and the ego vehicle are traveling in the same lane, defined by lane boundaries 401 and 403. The boundary 401 is a lane marker, whereas the boundary 403 is unmarked and corresponds to a road edge. The image 400 can be subjected to image processing, for example by the sensor processing module 330, to identify the lane boundaries 401 and 403. The identification of the lane boundaries can also use data from other sensors, for example by fusing information extracted from two or more of the surrounding cameras (e.g., front, side, rear). The image 400 can also be analyzed for tailgating indicators. For example, the vehicle 402 may have its headlamps 410 turned on (e.g., set to high or low beam). The vehicle 402 may also have activated a turn signal blinker, for example a left turn signal blinker 420. The activation of the headlamps 410 and the turn signal blinker 420 can be detected as illuminated regions in the image 400. The sensor processing module 330 may distinguish between headlamp activation (or flashing) and turn signal blinker activation based on image attributes including, for example, the color or brightness of the illuminated regions. The sensor processing module 330 may also determine which side of the vehicle 402 an activated headlamp or blinker is located on, for example using one or more reference points such as a right tire 430, a left tire 433, or a license plate 440. Based on the position of an illuminated region with respect to the vehicle 402, the sensor processing module 330 can identify a location of a headlamp and a location of a blinker in order to distinguish one from the other.

Image processing can also be used to determine a frequency with which a headlamp or blinker is activated, using a series of images captured over time, such as video images. A tailgating situation can be indicated, for example, by continuous activation of a headlamp (especially when set to high beam) over a certain period of time, or repeatedly turning the headlamp on and off (i.e., headlamp flashing). Thus, the duration of an illuminated region in a set of images can also be used for distinguishing headlamp flashing and turn signal blinker activation. Similarly, continuous activation of a blinker may indicate that the driver of the vehicle 402 intends to overtake the ego vehicle, another sign of a tailgating situation. The tailgating detection module 340 can use this information in determining whether a tailgating situation exists. In particular, activation of a left blinker or other turn signal blinker of the rear vehicle can be a second condition and flashing of a headlamp of the rear vehicle can be a third condition, with the second and third conditions being flagged separately from the first condition described above. The tailgating detection module 340 may take into account local driving rules or conventions when determining whether the driver of the vehicle 402 intends to overtake. For example, in countries where passing is generally performed by moving to the left of the vehicle being overtaken, the tailgating detection module 340 may monitor for activation of a left turn signal blinker.

FIG. 5 shows a scenario in which a tailgating situation is identifiable by determining lateral offsets of an ego vehicle 510 and a rear vehicle 520, for example offsets with respect to a center 500 of a lane in which the vehicles 510 and 520 are traveling. The lateral offsets correspond to the lateral distance between the center 500 and a central longitudinal axis 515 of the vehicle 510 or a central longitudinal axis 525 of the vehicle 520. The longitudinal axis 515 can be readily determined based on, for example, a predefined position of a sensor with respect to the longitudinal axis 515. The longitudinal axis 525 can be determined by tracking the spatial position of the vehicle 520 and computing the width of the vehicle 520 to locate its center. In FIG. 5, the ego vehicle 510 has a lateral offset 517 and the rear vehicle 520 has a lateral offset 527. The offsets can be computed based on data captured by a sensor suite, for example, by fusing image data with radar or LIDAR data. In one implementation, the sensor processing module 330 detects a left lane marker 501 and a right lane marker 503 to determine the position of the center 500. The sensor processing module 330 may then compute the offsets 517 and 527. In some implementations, the offsets 517 and 527 may be computed without directly referencing the center 500, for example by determining, for each vehicle 510 and 520, a lateral offset with respect to the left marker 501 and a lateral offset with respect to the right marker 503, and computing the offset 517 or 527 based on a difference between the lateral offset with respect to the left marker 501 and the lateral offset with respect to the right marker 503.

The offsets 517 and 527 can be used to determine whether the driver of the vehicle 520 intends to overtake the vehicle 510. If the offset 517 is within a certain percentage of a width 530 of the lane, but the offset 527 is to the left of the center 500 (assuming North American driving conventions) and greater than a certain percentage of the lane width 530, then the tailgating detection module 340 can flag this as a fourth tailgating condition. For example, the fourth condition may be flagged as true when the offset 517 is 15% or less and the offset 527 is 60% or more. If the offset 517 is not within a certain percentage of the lane width or the offset 527 is not greater than a certain percentage of the lane width, then the tailgating detection module 340 will flag the fourth condition as false. Thus, the fourth condition can be characterized as a lateral offset of the rear vehicle with respect to a center of a lane in which the ego vehicle and the rear vehicle are traveling exceeding a first offset threshold while a lateral offset of the ego vehicle with respect to the center of the lane is below a second offset threshold. The tailgating detection module 340 may require that the fourth condition be met for a certain duration before flagging the fourth condition as true. In some implementations, the percentage or other threshold metric applied to the offset 517 and/or the offset 527 may be variable, for example depending on whether vehicle 510 is to the left or the right of the center 500.

Figure 6:
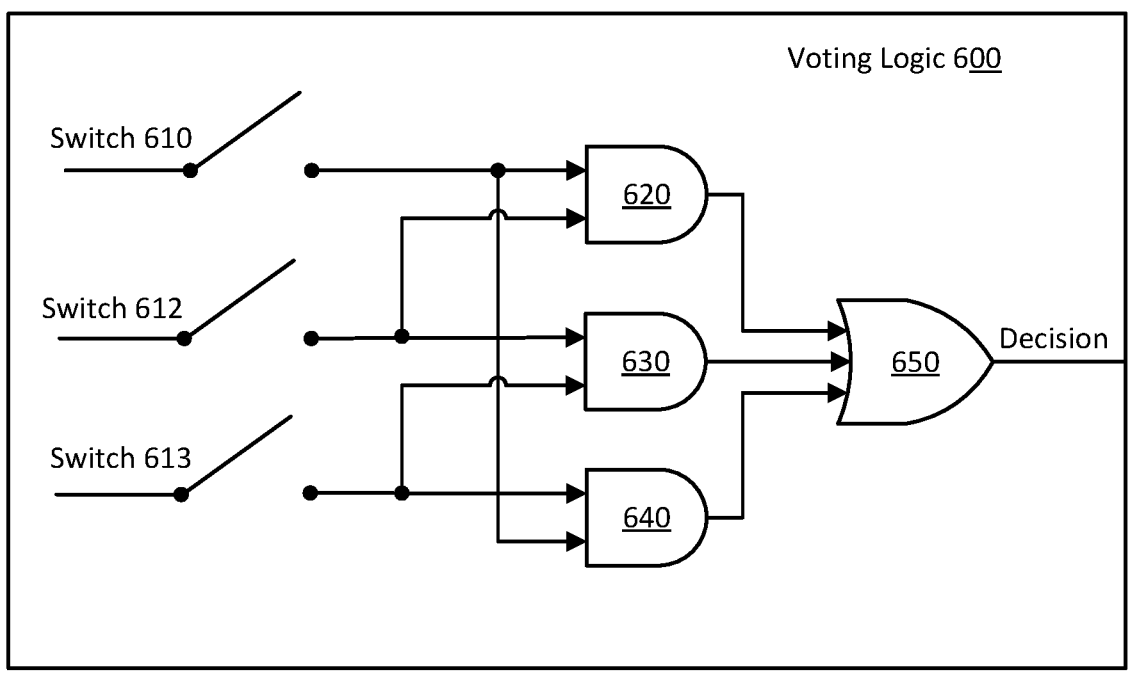
FIG. 6 is a partial schematic of control logic for detecting a tailgating situation, according to certain aspects of the present disclosure.

When considered individually, none of the four conditions described above is a sufficient indicator that there is a tailgating situation. However, if multiple ones of the four conditions exist, then it is highly likely that there is tailgating. FIG. 6 is a partial schematic of voting logic 600 for outputting a decision of whether a tailgating situation exists, based on the simultaneous occurrence of a plurality of conditions. The voting logic 600 includes a plurality of switches 610, 612, and 613, AND gates 620, 630, and 640, and an OR gate 650. The voting logic 600 has been simplified for illustration purposes and only shows evaluation of three conditions.

Each of the switches 610, 612, and 613 can default to an open state and can be closed in response to a signal generated when a corresponding condition occurs. For example, switch 610 may be closed in response to the time to collision being below a certain threshold (the first condition), switch 612 may be closed in response to the lateral offset condition being true (the second condition), and switch 613 may be closed in response to activation of a left blinker (the third condition). Each of the AND gates 620, 630, and 630 receives input signals supplied by a pair of switches. AND gate 620 is connectable to switches 610 and 612, AND gate 630 is connectable to switches 612 and 613, and AND gate 640 is connectable to switches 610 and 613. The outputs of the AND gates 620, 630, and 630 are supplied as inputs to OR gate 650. Thus, the OR gate 650 outputs a logical 1 value as the decision whenever any pair of the three conditions is true. For evaluation of all four conditions, the voting logic may require that three out of the four conditions be true.

The determination of whether a tailgating situation exists need not be based solely on the total number of conditions that exist simultaneously. For example, the determination may involve computing a score as a weighted sum, with different weights being assigned to each condition. In particular, the time to collision condition may be assigned a greater weight than, for example, the lateral offset condition. In some implementations, certain conditions must be present before a positive determination of a tailgating situation is made. For example, the time to collision condition may, in some instances, be a prerequisite. The positive determination may also depend on certain combinations of conditions being true.

Figure 7:
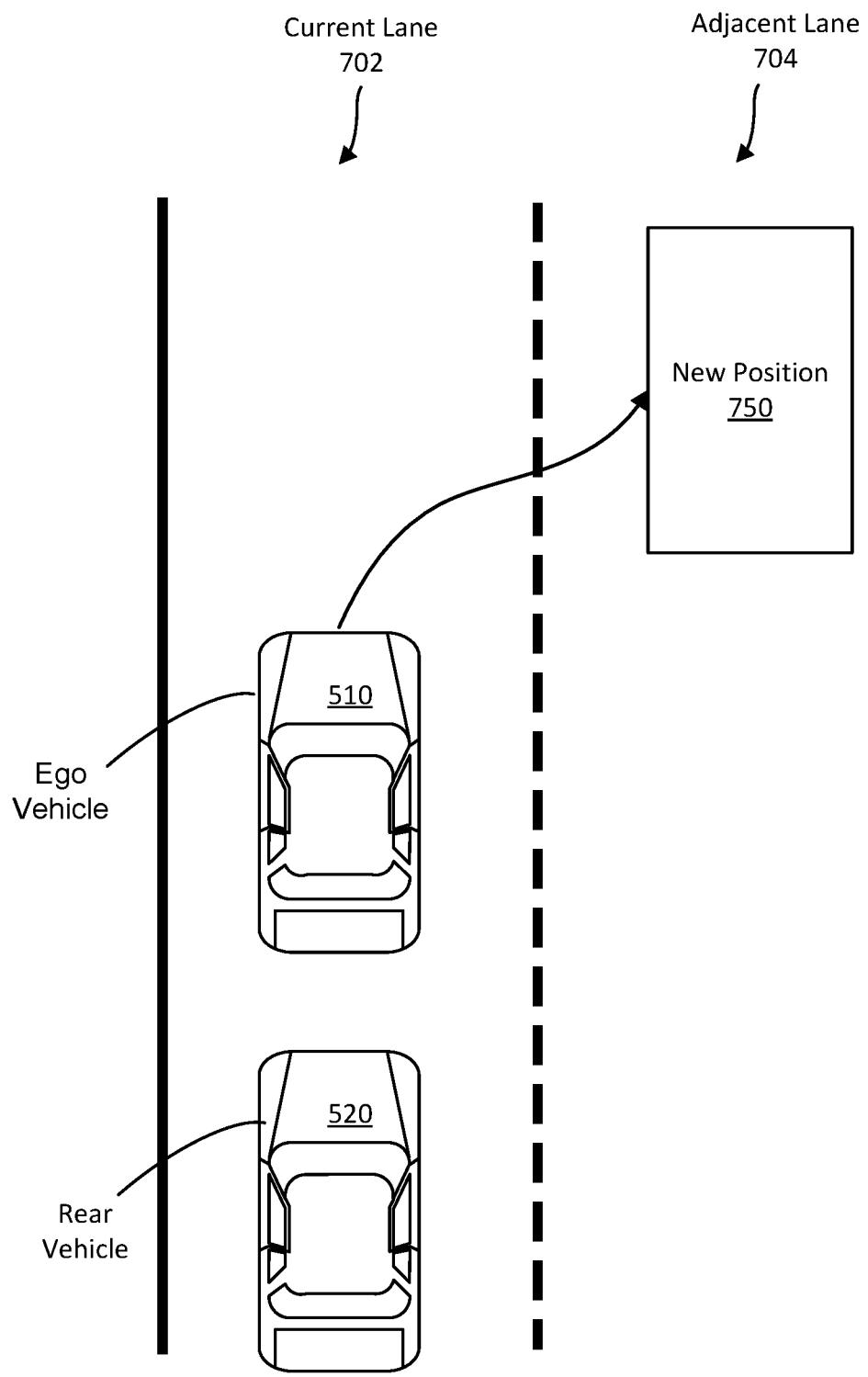
FIG. 7 illustrates a lane change maneuver.

In addition to tailgating detection, the present disclosure relates to determining an appropriate response for an automated vehicle when a tailgating situation has been detected. As mentioned earlier, one of the first response measures that an automated vehicle can perform is a lane change. FIG. 7 illustrates a lane change maneuver performed by the ego vehicle 510 in response to tailgating by the vehicle 520. First, the system checks whether an adjacent lane is available. For example, assuming North American driving conventions, the safety module 350 may confirm, based on output of the sensor processing module 330, that the adjacent lane 704 on the right is available based on a determination that there are no vehicles in the lane 704 within a certain distance ahead of or behind the vehicle 510. If so, then the safety module 350 initiates a lane change to the right by steering the vehicle 510 to a new position 750, preferably while maintaining the current speed of the vehicle 510. Thus, the rear vehicle 520 is allowed to overtake the ego vehicle 510. If no adjacent lanes are available, or if no lane change to the right is available, then the safety module 350 keeps the ego vehicle 510 in its current lane 702 and proceeds with alternative safety measures, described below.

Figure 8:
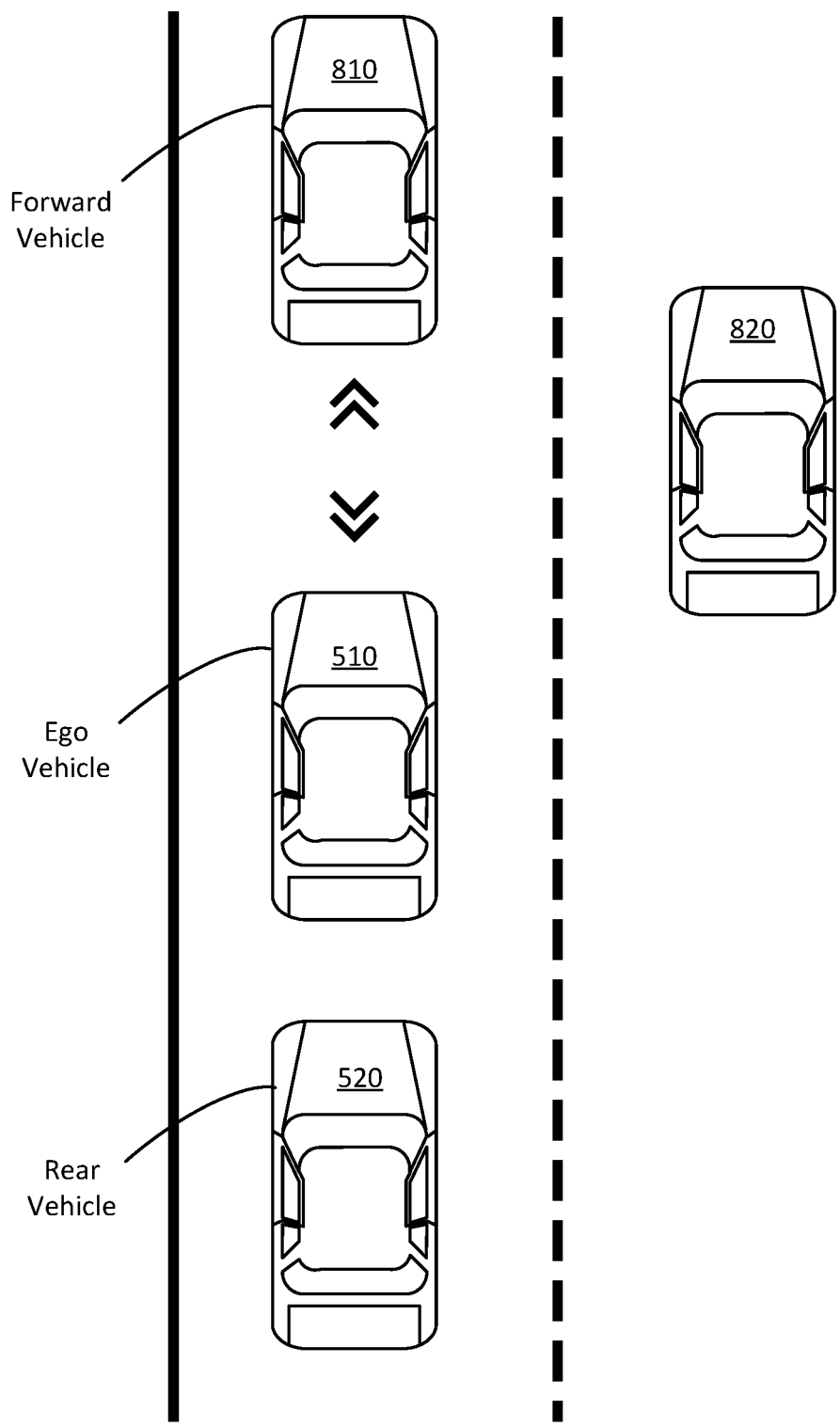
FIG. 8 illustrates an increase in a time gap to a forward vehicle.

FIG. 8 illustrates using longitudinal control to increase a time gap between the ego vehicle 510 and a forward vehicle 810. Longitudinal control can be performed as a next course of action when tailgating is detected, but no adjacent lanes or no lanes to the right are available, for example when a vehicle 820 in the right lane is too close to the ego vehicle 510. The time gap may correspond to an amount of time needed for the ego vehicle 510 to reach the current position of the forward vehicle 810 and can be calculated based on, for example, the speed of the ego vehicle 510, the speed of the forward vehicle 810, and the distance between the vehicles 510 and 810, i.e., the same parameters described earlier in connection with computing time to collision. In one example, if the ego vehicle is driving at the same speed as the forward vehicle, the ego vehicle may slowly decelerate to increase the time gap. In another example, if the ego vehicle and the forward vehicle are both accelerating to reach a new speed, the ego vehicle may decrease its acceleration rate compared to the acceleration rate of the forward vehicle to increase the distance from the forward vehicle and the time gap between the two vehicles. Other scenarios may also exist for increasing the time gap between the two vehicles. Although increasing the time gap between the ego vehicle and the forward vehicle has a temporary effect of decreasing the time to collision with the rear vehicle 520, the increase in time gap has the benefit of allowing the ego vehicle 510 to react smoothly to changes in traffic speed without surprising the driver of the rear vehicle 520. Thus the risk of collision with the rear vehicle 520 is reduced.

The increase in time gap between the ego vehicle and the forward vehicle may be accompanied by a decrease in a maximum permissible deceleration rate. The rate of change of acceleration or deceleration is known as jerk. While operating in automated driving mode, the system may set an initial value for the maximum permissible jerk for deceleration. The initial value is then lowered to a certain value in conjunction with setting longitudinal control parameters (e.g., acceleration and/or braking) to increase the time gap to a specified time gap value. The decrease in the maximum permissible deceleration rate prevents sudden braking by the vehicle 510 and provides a gradual and smooth transition into the new time gap. This also allows time for the driver of the rear vehicle 520 to acclimate to the changes to the longitudinal control parameters needed to establish the new time gap. In some embodiments, if there is no vehicle directly in front of the ego vehicle, an increase in time gap parameter may still be recorded in the set of operational parameters of the longitudinal control unit or ADAS for future use. For example, while the ego vehicle is being tailgated, another vehicle may move to the same lane as the ego vehicle and position itself directly in front of the ego vehicle. In this case, the ego vehicle may try to adapt to the increased time gap from the new vehicle in front of it by applying the previously recorded increase in time gap parameter. In some embodiments, a decrease in a maximum permissible deceleration rate may be performed independently from an increase in the time gap between the ego vehicle and the forward vehicle. In one embodiment, the time gap may be increased by a predefined percentage in response to a detected tailgating situation. For example, if a time gap between the ego vehicle and a forward vehicle is equal to 2 seconds, after detecting tailgating situation from an aggressive rear vehicle, the ego vehicle may increase its time gap by 30 percent and set the new time gap to 2+2*30/100=2.6 seconds. The maximum permissible deceleration rate can be adjusted according to a lookup table, as shown in FIG. 9.

FIG. 9 is a simplified example of a partial lookup table 90 for setting a maximum permissible deceleration rate. The lookup table 90 does not include all the parameters that could potentially be considered when adjusting longitudinal control parameters, but instead shows a mapping between the input parameters of distance to the rear vehicle, speed difference between the automated vehicle and the rear vehicle, and the output parameter of maximum permissible deceleration rate. In practice, the lookup table can be a multi-dimensional table with many additional input parameters, such as the distance to the forward vehicle 810, the time to collision with the rear vehicle 520, comfort tolerated by occupant(s) of the automated vehicle, and the like. Further, the values shown in table 90 are simply to illustrate the principle of varying the maximum permissible deceleration rate based on certain input parameters, and are not necessarily values that would be used in practice.

Table 90 divides the distance to the rear vehicle (in feet) into several ranges. The speed difference corresponds to the difference between the speed of the ego vehicle and the speed of the rear vehicle. In some implementations, the lookup table can also take into consideration the speed difference between the ego vehicle and the forward vehicle. As with the distance, the speed difference is divided into several ranges. Alternative lookup tables might provide mappings to individual parameter values rather than value ranges. A system using such a table could interpolate values missing from the table, for example based on a mathematical function that approximates the mapping between input parameters and output parameters described in the table.

As shown in FIG. 9, the maximum permissible deceleration rate generally increases with the increase in distance to the rear vehicle. On the other hand, the maximum permissible deceleration rate generally decreases with increasing speed difference between the ego vehicle and the rear vehicle, i.e., a lower maximum permissible deceleration rate can be set when the speed difference is larger. For example, at a speed difference of 0-10 miles per hour (mph), if the rear vehicle is very close to the automated vehicle (e.g., the distance from the rear vehicle is between 0-6 feet), the maximum permissible deceleration rate is low (e.g., 7.5 feet per second squared ($ft/s^2$)). On the other hand, when the distance between the automated vehicle and the rear vehicle is larger (e.g., distance=30 feet), the maximum permissible deceleration rate is larger for the same speed difference of 0-10 mph (e.g., 10.5 $ft/s^2$).

Figure 10:
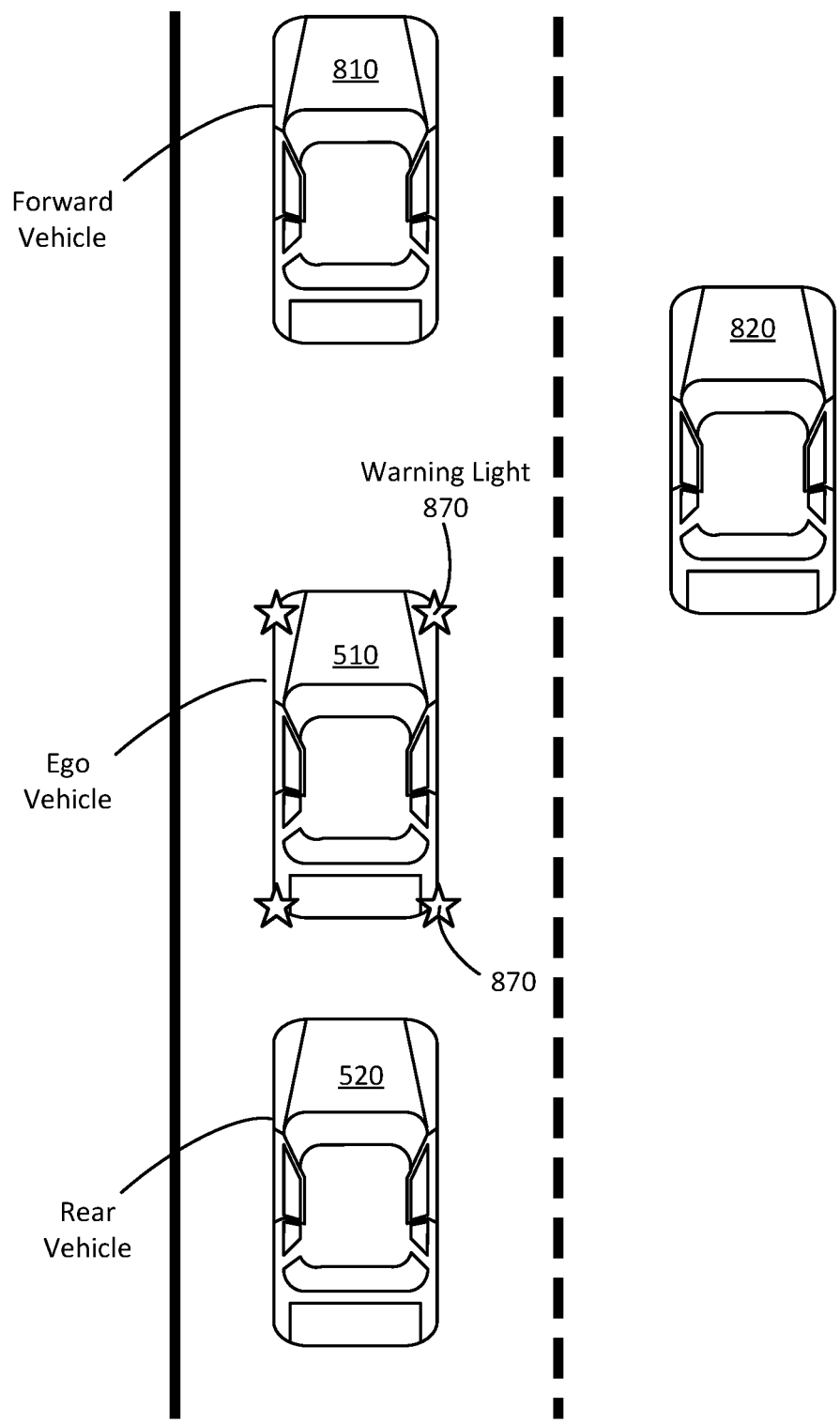
FIG. 10 illustrates flashing of warning lights.

If the rear vehicle keeps tailgating for a certain period of time, the ego vehicle can flash its warning lights to indicate to the rear vehicle that the situation is dangerous. The flashing of the warning lights may also indicate that the ego vehicle is being driven in an automated driving mode and reacting automatically to a dangerous situation, so that the driver of the rear vehicle understands that the driver of the ego vehicle is not intentionally trying to impede the rear vehicle's movement. As shown in FIG. 10, the ego vehicle 510 may flash all four of its warning lights 870, thus alerting not only the rear vehicle 520, but also the forward vehicle 810. In some implementations, the ego vehicle may only flash its rear warning lights or flash its warning lights in a predefined pattern that is similar to or different from a standard warning light pattern. For example, the warning lights may be flashed using a varying frequency, possibly at a greater frequency when the time to collision with the rear vehicle is shorter and then decreasing the frequency as the rear vehicle backs off.

Another safety measure that can be performed in response to a tailgating situation is adjusting longitudinal control parameters based on upcoming speed limit changes. In some implementations, the system predicts that the ego vehicle is approaching an area where the speed limit is different, in particular, lower than the current speed of the ego vehicle. The ego vehicle may be equipped with map data, including an electronic map from which the speed limit can be ascertained, such as the map data 24 in FIG. 2. In some instances, the ego vehicle may be in communication with a remote service provider that transmits map, navigation, and other relevant information to the ego vehicle. The system can analyze this locally stored or remotely transmitted information in conjunction with monitoring the ego vehicle's geographical position, for example using the GPS sensor 20, to identify upcoming speed limit changes, such as a speed limit for an upcoming section of a road along with the vehicle is traveling or for multiple roads along a planned route.

Generally, the system will keep the ego vehicle to within the speed limit specified for the vehicle's current location. If the system recognizes that an upcoming speed limit is lower than a speed limit of the current location, or if the current speed of the ego vehicle is higher than the upcoming speed limit, then the system can, in response to the ego vehicle being tailgated, adjust the longitudinal control parameters while keeping a smooth and safe deceleration (e.g., by decreasing the maximum permissible deceleration rate as described earlier). In contrast to the earlier example where the longitudinal control parameters were adjusted in order to establish a larger time gap between the ego vehicle and a forward vehicle, the purpose of the adjustment here is to facilitate a smooth transition to the upcoming speed limit. The system may calculate when it has to trigger a change in longitudinal control parameters, for example when to begin decelerating or braking, taking into consideration the decreased maximum permissible deceleration rate, in order to reach the upcoming speed limit by the time the vehicle enters the location of the upcoming speed limit (e.g., when the vehicle reaches a traffic sign on which the upcoming speed limit is posted). In this manner, the system avoids a need to perform last minute braking that could surprise the tailgating driver and lead to a collision.

Figure 11:
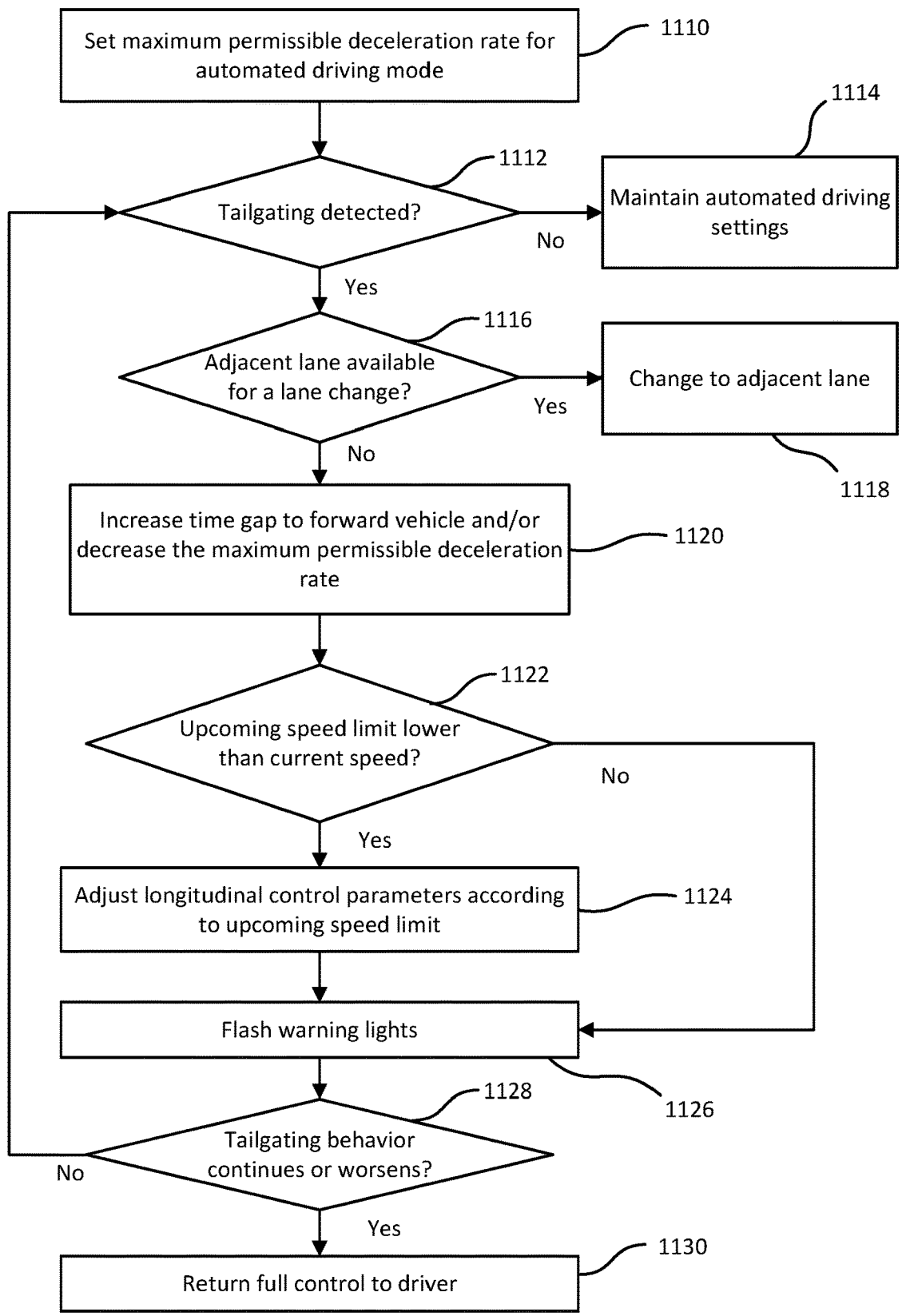
FIG. 11 illustrates a method for handling tailgating during automated driving, according to certain aspects of the present disclosure.

FIG. 11 illustrates a method 1100 for handling tailgating during automated driving, according to certain aspects of the present disclosure. The method 1100 can be performed using the various systems and apparatus described earlier, including the system 200 and the automated driving control unit 300. At 1110, the system enters an automated driving mode and sets an initial maximum permissible deceleration rate.

At 1112, the system determines whether tailgating is detected while the vehicle is in the automated driving mode, using data collected by a sensor suite including, for example, a rear facing camera, and a plurality of radar and/or LIDAR sensors. If tailgating is detected, for example, based on a simultaneous occurrence of multiple ones of the example conditions described earlier, then the method proceeds to step 1116. Otherwise, the method proceeds to 1114.

At 1114, tailgating has not been detected and the system maintains the current automated driving settings including, for example, maintaining the maximum permissible deceleration rate that was set in step 1110, and maintaining a currently set acceleration amount.

At 1116, tailgating has been detected and the system performs an automated safety routine that includes determining whether an adjacent lane is available for a lane change, for example, whether there is an adjacent lane to the right in which there are no vehicles within a certain distance of the ego vehicle. If the adjacent lane is available, the method proceeds to step 1118, otherwise the method proceeds to step 1120.

At 1118, an adjacent lane is available and the system initiates a change to the adjacent lane. In some instances, for example depending on the settings of the automated driving mode, the system automatically performs a lane change maneuver without any driver input. In other instances, the system may request confirmation from the driver before performing the lane change maneuver.

At 1120, no adjacent lanes are available for a lane change and the system increases a time gap to a forward vehicle that is ahead of the ego vehicle in the same lane. In addition or alternatively, the system decreases the maximum permissible deceleration rate, thereby allowing additional time to establish the new time gap compared to the time needed if the maximum permissible deceleration rate set in step 1110 was used. In some embodiments, the system decreases the maximum permissible deceleration rate while increasing the time gap between the ego vehicle and the forward vehicle, e.g., by setting a lower maximum permissible deceleration rate simultaneously with initiating the increase in the time gap or by gradually lowering the maximum permissible deceleration rate as the time gap is being increased. Using appropriate amounts of acceleration and/or braking, and making appropriate adjustments to these amounts as needed, the system gradually transitions the ego vehicle to the new time gap. The time gap and the maximum permissible deceleration rate may be set based on a lookup table, such as table 90 in FIG. 9. Step 1120 may only adjust the maximum permissible deceleration rate when there are no vehicles directly ahead of the ego vehicle or when the existing time gap to the forward vehicle is at least equal to the time gap to be established.

At 1122, the system determines, using map data, whether an upcoming speed limit is lower than the current speed of the ego vehicle. If so, then the method proceeds to step 1124, otherwise the method proceeds to step 1126.

At 1124, the system adjusts the longitudinal control parameters according to the upcoming speed limit. Using appropriate amounts of acceleration and/or braking, the system gradually transitions the ego vehicle to the upcoming speed limit while decreasing the maximum permissible deceleration rate relative to the rate in step 1110. For example, the system may calculate an amount of time needed to decelerate to the speed limit from the current speed without exceeding the maximum permissible deceleration rate, and automatically adjust an amount of acceleration and/or braking to reach the speed limit within at least the calculated amount of time, thus giving adequate time to reach the speed limit. The system may also trigger the acceleration and/or braking adjustment early enough so that the ego vehicle will have decelerated to the speed limit by the time the location of the speed limit is reached.

At 1126, the system flashes the warning lights of the ego vehicle in response to continued detection of tailgating, after having increased the time gap in step 1120. The system may flash the warning lights immediately before or after performing the safety measures in steps 1120 and 1124. Alternatively, the system may wait for a certain period of time to confirm that the tailgating persists before flashing the warning lights.

At 1128, the system determines whether the tailgating behavior continues or worsens. A positive determination of continued or worsening tailgating behavior can be made, for example, when there is an increase in the total number of simultaneously occurring ones of the four conditions described earlier, or when additional ones of the four conditions are detected. Additional conditions besides those previously described, such as activation of a horn of the rear vehicle, can also serve as indicators of continued or worsening tailgating behavior. If the determination in step 1128 is positive, the method proceeds to step 1130. If the determination is negative, the method returns to step 1112, where the system repeats the determination of whether tailgating is detected.

At 1130, the system has determined that the tailgating behavior has continued or worsened despite performing at least one of the safety measures in the earlier steps, e.g., after having decreased the maximum permissible deceleration rate in step 1120. In response, the system returns full control to the driver by deactivating the automated driving mode and activating a manual driving mode. In addition, the system might flash the warning lights while returning the full control to the driver. Depending on the level of automation associated with the automated driving mode, the system may prompt the driver to take back control at different times. For example, if the automated driving mode is SAE level 2, the system may request that the driver take back control earlier compared to if the automated driving mode is SAE level 3. Before outputting the request to the driver, the system may estimate a time to collision between the ego vehicle and the rear vehicle, and use the estimated time to collision to determine how much time is needed for the driver of the ego vehicle to take back full control. If the time to collision is less than the time needed to take back full control, and the time to collision is smaller than a threshold duration (e.g., 0.5 s), the system may forgo requesting driver control, and instead perform an automated emergency response such as preparing for activation of seatbelts, airbags, or other safety devices. Thus, the activation of the manual driving mode may be conditioned upon the amount of time needed to take back full control being less than the time to collision.

Some portions of this description describe the embodiments of the disclosure in terms of algorithms and operations. These operations are understood to be implemented by computer programs or equivalent electrical circuits, machine code, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. Although the steps, operations, or processes are described in sequence, it will be understood that in some embodiments the sequence order may differ from that which has been described, for example with certain steps, operations, or processes being omitted or performed in parallel or concurrently.

In some embodiments, a software module is implemented with a computer program product comprising a non-transitory computer-readable storage medium containing computer program code, which can be executed by one or more computer processors to cause the one or more processors to perform any or all of the steps, operations, or processes described. Examples of a non-transitory storage medium include, but are not limited to, a magnetic disk or tape, optical storage media such as compact disk (CD) or digital versatile disk (DVD), flash memory, or other memory devices.

The specification and drawings are, accordingly, to be regarded in an illustrative rather than a restrictive sense. It will, however, be evident that additions, subtractions, deletions, and other modifications and changes may be made thereunto without departing from the broader spirit and scope set forth in the claims. Thus, although specific embodiments have been described, these are not intended to be limiting. Various modifications and equivalents are within the scope of the following claims.

What is claimed is:

1. A computer implemented method, comprising:
   detecting, by a processor of a computer in a first motor vehicle, while the first motor vehicle is in an automated driving mode, a tailgating situation involving a second motor vehicle behind the first motor vehicle; and
   responsive to the detected tailgating situation, performing an automated safety routine including:
      determining whether any adjacent lane is available for a lane change;
      as an initial course of action, performing a lane change to an adjacent lane when the adjacent lane is determined to be available; and
      when it is determined that no adjacent lanes are available for a lane change, decreasing a maximum permissible deceleration rate while increasing a time gap between the first motor vehicle and a third motor vehicle directly in front of the first motor vehicle by automatically adjusting an amount of at least one of acceleration or braking.

2. The method of claim 1, wherein the tailgating situation is detected in response to identifying, by the processor of the computer, a simultaneous occurrence of two or more of the following conditions:
   an estimated time to collision between the first and second motor vehicles being below a threshold time to collision;
   a lateral offset of the second motor vehicle with respect to a center of a lane in which the first and second motor vehicles are traveling exceeding a first offset threshold while a lateral offset of the first motor vehicle with respect to the center of the lane is below a second offset threshold;
   activation of a turn signal blinker of the second motor vehicle; and
   flashing of a headlamp of the second motor vehicle.

3. The method of claim 2, further comprising:
   capturing a plurality of images of the second motor vehicle using a camera mounted on a rear of the first motor vehicle; and
   detecting at least one of the activation of the turn signal blinker or the flashing of the headlamp from the images, including distinguishing between turn signal blinker activation and headlamp flashing based on at least one of a brightness, a color, a duration, or a position with respect to the second motor vehicle, of an illuminated region in the images, wherein the two or more conditions include one or more of the activation of the turn signal blinker and the flashing of the headlamp.

4. The method of claim 2, further comprising:
   capturing data by a plurality of sensors, including radar sensors and Light Detection and Ranging (LIDAR) sensors, wherein the radar sensors provide at least a partial overlap in coverage with the LIDAR sensors in an environment around the first motor vehicle; and
   estimating the time to collision and the lateral offsets of the first and second motor vehicles using the captured data,
   wherein the two or more conditions include the estimated time to collision being below the threshold time to collision and the lateral offset of the second motor vehicle exceeding the first offset threshold while the lateral offset of the first motor vehicle is below the second offset threshold.

5. The method of claim 2, wherein the two or more conditions include the lateral offset of the second motor vehicle exceeding the first offset threshold while the lateral offset of the first motor vehicle is below the second offset threshold, and wherein the first offset threshold is greater than the second offset threshold.

6. The method of claim 1, further comprising:
   setting the maximum permissible deceleration rate based on one or more of a speed difference between the first and the second motor vehicles, and a distance between the first and second motor vehicles.

7. The method of claim 6, further comprising:
   setting a lower maximum permissible deceleration rate when the speed difference between the first and second motor vehicles is larger.

8. The method of claim 1, further comprising:
increasing the time gap by a predefined percentage in response to the detected tailgating situation.

9. The method of claim 1, further comprising:
responsive to continued detection of the tailgating situation after increasing the time gap between the first motor vehicle and the third motor vehicle, activating a warning light towards the second motor vehicle.

10. The method of claim 1, further comprising:
identifying, using an electronic map, a speed limit of an upcoming section of a road along which the first motor vehicle is traveling, the speed limit being lower than a current speed of the first motor vehicle; and
responsive to the detected tailgating situation, and when no adjacent lanes are available for a lane change:
calculating an amount of time needed to decelerate to the speed limit from the current speed without exceeding the maximum permissible deceleration rate, and
automatically adjusting an amount of at least one of acceleration or braking to reach the speed limit within at least the calculated amount of time.

11. The method of claim 1, further comprising:
estimating a time to collision between the first and second motor vehicles;
determining an amount of time needed for a driver of the first motor vehicle to take back full control; and
activating a manual driving mode in response to detecting that the tailgating situation continues or worsens after the decreasing of the maximum permissible deceleration rate, wherein the activating of the manual driving mode is conditioned upon the amount of time needed to take back full control being less than the time to collision.

12. The method of claim 1, further comprising:
enabling the safety routine only when the automated driving mode is Society of Automotive Engineers (SAE) level 2 or higher.

13. A computer-readable storage medium containing instructions that, when executed by one or more processors of a computer, cause the one or more processors to perform processing comprising:
detecting, while a first motor vehicle is in an automated driving mode, a tailgating situation involving a second motor vehicle behind the first motor vehicle; and
responsive to the detected tailgating situation, performing an automated safety routine including:
determining whether any adjacent lane is available for a lane change;
as an initial course of action, performing a lane change to an adjacent lane when the adjacent lane is determined to be available; and
when it is determined that no adjacent lanes are available for a lane change, decreasing a maximum permissible deceleration rate while increasing a time gap between the first motor vehicle and a third motor vehicle directly in front of the first motor vehicle by automatically adjusting an amount of at least one of acceleration or braking.

14. An automated driving apparatus, comprising:
a control circuit in a first motor vehicle, the control circuit operable to:
receive data from a plurality of sensors positioned along a perimeter of the first motor vehicle, the sensors including radar sensors, Light Detection and Ranging (LIDAR) sensors, and cameras;
detect, while the first motor vehicle is in an automated driving mode, a tailgating situation involving a second motor vehicle behind the first motor vehicle; and
responsive to the detected tailgating situation, perform an automated safety routine including:
determining whether any adjacent lane is available for a lane change;
as an initial course of action, initiating a lane change to an adjacent lane when the adjacent lane is determined to be available; and
when it is determined that no adjacent lanes are available for a lane change, decreasing a maximum permissible deceleration rate while increasing a time gap between the first motor vehicle and a third motor vehicle directly in front of the first motor vehicle by automatically adjusting an amount of at least one of acceleration or braking.

15. The automated driving apparatus of claim 14, wherein the control circuit detects the tailgating situation in response to identifying a simultaneous occurrence of two or more of the following conditions:
an estimated time to collision between the first and second motor vehicles being below a threshold time to collision;
a lateral offset of the second motor vehicle with respect to a center of a lane in which the first and second motor vehicles are traveling exceeding a first offset threshold while a lateral offset of the first motor vehicle with respect to the center of the lane is below a second offset threshold;
activation of a turn signal blinker of the second motor vehicle; and
flashing of a headlamp of the second motor vehicle.

16. The automated driving apparatus of claim 15, wherein the control circuit is operable to:
capture a plurality of images of the second motor vehicle using a camera mounted on a rear of the first motor vehicle; and
detect at least one of the activation of the turn signal blinker or the flashing of the headlamp from the images, including distinguishing between turn signal blinker activation and headlamp flashing based on at least one of a brightness, a color, a duration, or a position with respect to the second motor vehicle, of an illuminated region in the images,
wherein the two or more conditions include the estimated time to collision being below the threshold time to collision and the lateral offset of the second motor vehicle exceeding the first offset threshold while the lateral offset of the first motor vehicle is below the second offset threshold.

17. The automated driving apparatus of claim 15, wherein the two or more conditions include the lateral offset of the second motor vehicle exceeding the first offset threshold while the lateral offset of the first motor vehicle is below the second offset threshold, and wherein the first offset threshold is greater than the second offset threshold.

18. The automated driving apparatus of claim 14, wherein the control circuit is operable to:
set the maximum permissible deceleration rate based on one or more of a speed difference between the first and second motor vehicles, and a distance between the first and second motor vehicles.

19. The automated driving apparatus of claim 14, wherein the control circuit is operable to:
responsive to continued detection of the tailgating situation after increasing the time gap between the first motor vehicle and the third motor vehicle, activate a warning light towards the second motor vehicle.

20. The automated driving apparatus of claim 14, wherein the control circuit is operable to:
- identify, using an electronic map, a speed limit of an upcoming section of a road along which the first motor vehicle is traveling, the speed limit being lower than a current speed of the first motor vehicle; and
- responsive to the detected tailgating situation, and when no adjacent lanes are available for a lane change:
  - calculate an amount of time needed to decelerate to the speed limit from the current speed without exceeding the maximum permissible deceleration rate, and
  - automatically adjust an amount of at least one of acceleration or braking to reach the speed limit within at least the calculated amount of time.

* * * * *